United States Patent [19]

Eisenberg et al.

[11] 4,379,375
[45] Apr. 12, 1983

[54] HYDROPONIC GROWING SYSTEM AND METHOD

[75] Inventors: Steven K. Eisenberg, Simi; Mark W. Hancock, Los Angeles, both of Calif.

[73] Assignee: Whittaker Corporation, Los Angeles, Calif.

[21] Appl. No.: 245,557

[22] Filed: Mar. 19, 1981

[51] Int. Cl.³ .............................................. A01G 31/02
[52] U.S. Cl. ........................................................ 47/65
[58] Field of Search ...................................... 47/59–65, 47/58, 39, 84–87

[56] References Cited

U.S. PATENT DOCUMENTS

| | | | |
|---|---|---|---|
| 3,276,163 | 10/1966 | Oepen et al. | 47/60 |
| 3,327,425 | 6/1967 | Dosedla et al. | 47/60 |
| 3,352,057 | 11/1967 | Ferrand | 47/59 |
| 3,432,965 | 3/1969 | Smith et al. | 47/60 |
| 3,667,157 | 6/1972 | Longhini | 47/65 |
| 3,823,508 | 7/1974 | Takehara | 47/63 |
| 3,852,912 | 12/1974 | Diller | 47/84 |
| 4,028,847 | 6/1977 | Davis et al. | 47/65 |
| 4,035,950 | 7/1977 | Anselm | 47/59 |
| 4,166,341 | 9/1979 | Vestergaard | 47/59 |
| 4,192,097 | 3/1980 | Smith | 47/59 |
| 4,211,034 | 7/1980 | Piesner | 47/59 |
| 4,216,618 | 8/1980 | Haub et al. | 47/65 |
| 4,255,896 | 3/1981 | Carl | 47/62 |

OTHER PUBLICATIONS

Anon., "Danes Try Conveyor Belt Cropping", *The Grower*, Aug. 31, 1978, pp. 395, 396 (only).

*Primary Examiner*—James R. Feyrer
*Attorney, Agent, or Firm*—Donald E. Nist

[57] ABSTRACT

An improved hydroponic growing system comprises, in combination, an elongated preferably rectangular hollow trough having substantially closed sidewalls and bottom and an open top defining a central space. The trough defines a pair of spaced tracks extending the length thereof in the space and an elongated flexible strip is slideably disposed in the tracks. The strip contains a plurality of spaced apertures extending vertically therethrough along the length thereof and in each aperture is disposed a plant growing cup having a hollow body defining a central space, an open top, a porous bottom and substantially closed or perforated sidewalls. The sidewalls bear outwardly extending peripheral supports so that the body of the cup extends down into the trough space and the cup is releasably held in position by the support bearing on the upper face of the strip. The porous cup bottom may include a metal or plastic grid or may be formed integrally with the sidewalls and contain a plurality of holes sufficiently large to permit plant roots and hydroponic fluid to pass through but small enough to prevent plant seeds from falling down therethrough. Preferably, the cup is conical or cylindrical and the strip is a single continuous strip. Alternatively, the strip can comprise a plurality of substrips linked lengthwise together. The trough may include an internal conduit with spaced openings to supply hydroponic makeup fluid to the trough space. The trough includes spaced hydroponic fluid exits for removal of hydroponic fluid.

17 Claims, 9 Drawing Figures

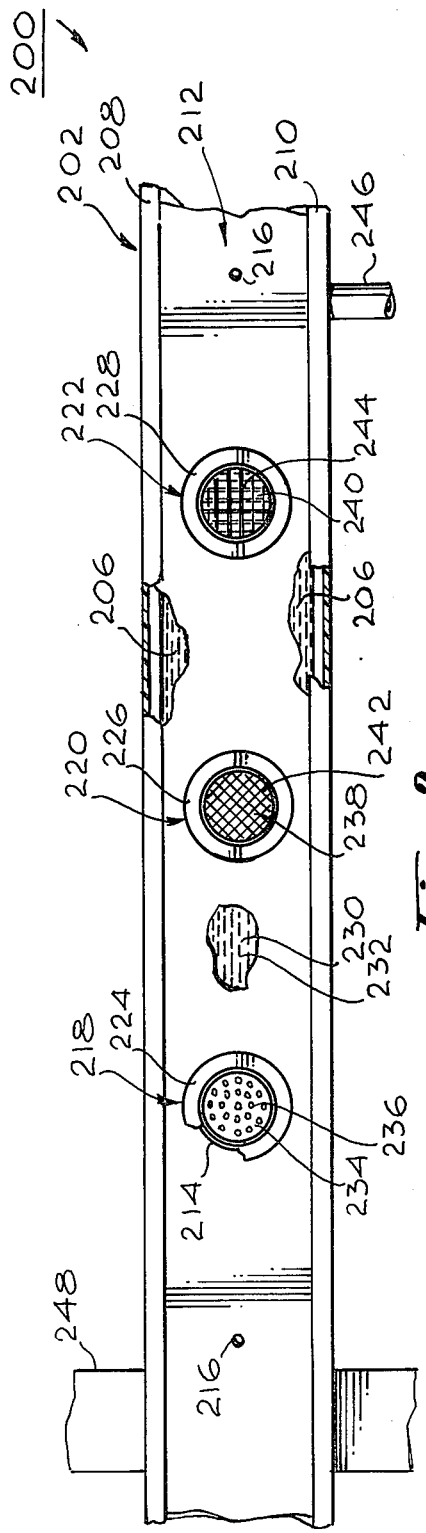
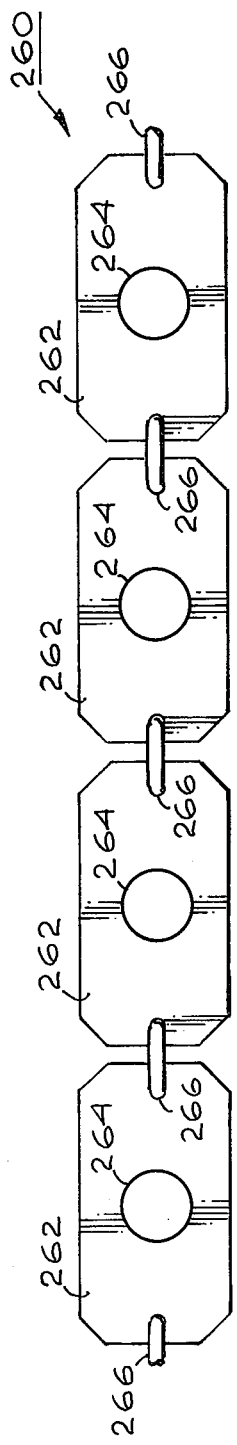
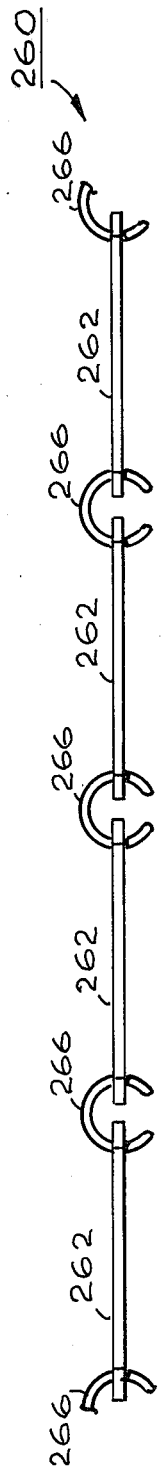

HYDROPONIC GROWING SYSTEM AND METHOD

BACKGROUND OF THE INVENTION

1. Field of the Invention

The present invention generally relates to a plant growing method and apparatus and more particularly relates to an improved hydroponic growing system and method.

2. Prior Art

Various types of equipment and methods have been devised for hydroponic growing. In some instances troughs have been provided in concrete floors and plants grown in holders in such troughs. The plants are removed from the troughs when fully grown and are then transferred to a harvesting operation. Most of those hydroponic growing systems which can be automated are extremely expensive and complicated and are subject to periodic breakdown. Certain types of plants can be much more efficiently grown hydroponically than by the traditional in-the-ground methods, in part due to the ability of hydroponic systems to control the nutrients to the plants in such a way as to stimulate more rapid growth. Hydroponic growing systems are particularly useful for regions where the ambient temperature and/or soil conditions preclude efficient growing by conventional methods. Nevertheless, hydroponic growing systems are not as yet very popular because of the initial costly outlay required and the uncertain results obtained with certain of such systems.

It would be desirable to be able to provide an improved hydroponic growing system and method which would be capable of continuous use over long periods of time with minimal supervision and which would be initially relatively inexpensive and would be durable. Ideally, the system should be adaptable for growing plants from seeds rather than seedlings or relatively mature plants and the system should provide an efficient means for removal of plants for harvesting and for insertion of new plants for hydroponic growing.

SUMMARY OF THE INVENTION

The improved hydroponic growing system and method of the present invention satisfy the foregoing needs. The method and system are substantially as set forth in the Abstract above. Thus, an elongated hollow trough is provided which can be supported by a base support of any suitable type and which is formed of substantially closed sidewalls and bottom, an open top defining a central space and periodic inlets and outlets for the supply of hydroponic growing fluid to the trough and removal of depleted fluid from the trough. The trough is in part characterized by having spaced tracks extending the length thereof into the space.

An elongated flexible resilient strip is slideably disposed in the tracks and defines spaced apertures extending vertically therethrough along the length of the strip. A plant growing cup is disposed through each aperture and hangs down into the central space of the trough into contact with or slightly above the hydroponic growing fluid in the trough. An expanded upper rim on the cup contacts the strip in the area around the aperture to releasably hold the cup in the vertical suspended position. The cup is hollow, has substantially closed or perforated sidewalls and an open top and porous bottom. The bottom may include a pellet of peat or the like rooting medium, or a wire or plastic grid or may be formed integral with the sidewalls and define spaced holes. The holes are large enough to allow passage of plant roots and hydroponic fluid therethrough but small enough to prevent the passage of seeds (for the particular plant to be grown therein) down therethrough. In addition, the cup may be filled with inert or non-inert growing medium.

The cups may be initially provided in a separate seedling growing zone with plant seeds and when the plants have reached the desired size the cups with plants therein are transferred to the upstream end of the strip in the trough. When the plants reach maturity in the trough and harvesting is desired, the strip is pulled towards the downstream end of the trough where the plants are cut from the cups or the cups are initially lifted out of the strip and the plants subsequently are harvested. Fresh increments of the strip are supplied to the upstream end of the trough and new cups containing plant seedlings are added to these fresh increments so that the growing system and method continues.

Internal and/or external conduits may be provided in the trough to supply makeup hydroponic growing fluid to the system. Various other features of the present invention are set forth in the following detailed description and accompanying drawings.

DRAWINGS

FIG. 2 is a schematic fragmentary top plan view, partly broken away, of a second preferred embodiment of the improved hydroponic growing system of the present invention;

FIG. 7 is a schematic fragmentary top plan view of a modified version of the strip utilized in the improved system of the present invention;

FIG. 8 is a schematic fragmentary side elevation of the strip of section 7; and, FIG. 9 is a schematic transverse cross-section of a third preferred embodiment of the improved hydroponic growing system of the present invention.

DETAILED DESCRIPTION

Figure 1:
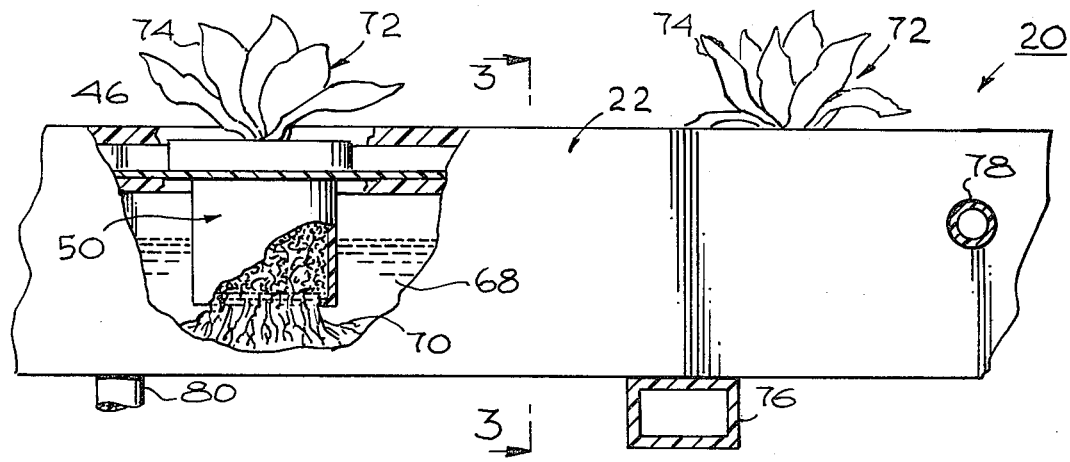
FIG. 1 is a schematic fragmentary side elevation, partly in section and partly broken away, illustrating a first preferred embodiment of the improved hydroponic growing system of the present invention, shown with a plurality of plants being grown in said system.
Figure 3:
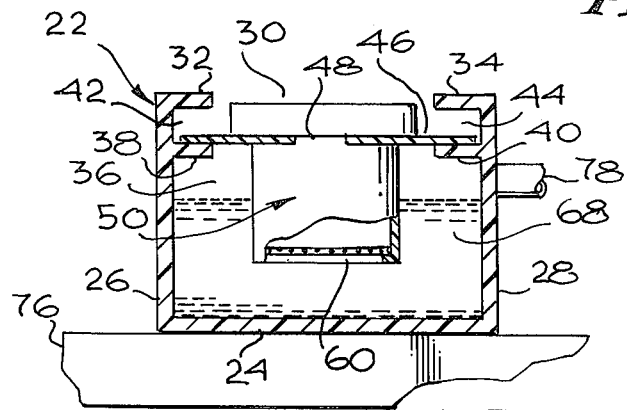
FIG. 3 is a schematic cross-section taken along the section line 3—3 of FIG. 1.
Figure 4:
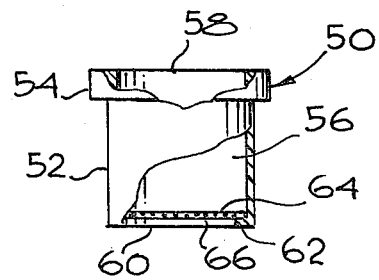
FIG. 4 is a schematic side elevation, partly broken away and partly in section, of a growing cup as utilized in the system of FIG. 1.
Figure 5:
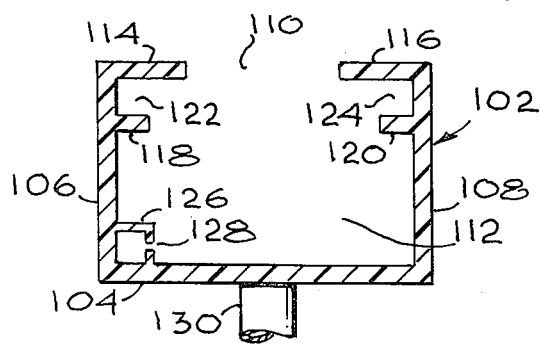
FIG. 5 is a schematic transverse cross-section of modified version of the trough used in the improved growing system of the present invention.

FIGS. 1, 3 and 4

A first preferred embodiment of the improved hydroponic growing system of the present invention is schematically depicted in FIGS. 1, 3 and 4. Thus, system 20 is shown in side elevation and comprises an elongated generally rectangular trough 22. Trough 22, as shown particularly in transverse cross-section in FIG. 3, comprises a closed flat horizontal bottom 24, vertical sidewalls 26 and 28 integral with bottom 24 and an open top 30 defined by inwardly directed horizontal top flanges 32 and 34 running the length of trough 22. Trough 22 defines a central space 36. A pair of horizontal flanges 38 and 40 extend inwardly in space 36 below and parallel to flanges 32 and 34 defining therewith tracks 42 and 44 within which is slideably received a longitudinally extending flat self-support thin flexible strip 46.

Strip 46 is provided with a plurality of spaced openings 48 extending vertically through strip 46. A plurality of cups 50 are disposed vertically through openings 48. Each cup 50 comprises a hollow, preferably cylindrical body 52 having an upper outwardly extending peripheral rim 54 which holds each cup 50 in the desired vertical orientation with body 52 extending down into space 36. Rim 54 rests on the upper surface of strip 46 in the area immediately peripheral of each opening 48. Body 52 and rim 54 define a central space 56 which extends from the open top 58 of cup 50 to the porous bottom 60 of cup 50.

In the embodiment shown in FIGS. 1, 3 and 4, bottom 60 is provided with an inwardly directed peripheral flange 62 upon which rests a horizontally extending screen 64 having a plurality of vertical openings 66 therein dimensioned to permit hydroponic growing fluid 68 and plant roots 70 to pass therethrough while plant 72 is disposed in space 56 with the leaves 74 thereof extending above trough 22. Cup 50 is dimensioned relative to trough 22 and strip 46 is positioned in trough 22 such that bottom 60 of cup 50 is above bottom 24 of trough 22. Trough 22 may be supported in a horizontal position as by one or a plurality of base supports such as transverse beam 76 or the like.

Hydroponic growing fluid inlets 78 are provided at intervals along the length of trough 22 and one or more bottom exit lines 80 are connected to trough 22 at selected points along the bottom thereof for removing depleted hydroponic growing fluid 68 from trough 22. Apertures 48 are spaced at desirable intervals along the length of strip 46 to permit optimal growing of plants 72 in the hydroponic growing fluid 68.

When it is desired to remove mature grown plants 72 from system 20, strip 46 is advanced downstream to adjacent the downstream end of trough 22 and plants 72 are either severed from or with cups 50 and/or are removed from trough 22 by cups 50 for harvesting. By downstream is meant the direction in which strip 46 progresses, even though the hydroponic fluid may be traveling in the opposite direction. Strip 46 can then be returned, preferably after sterilization, to the upstream end of trough 22 for reuse. So also can cups 50. Ideally, cups 50 are first placed in a seedling growing zone separate from trough 22 and seeds are placed on screen 64 thereof and hydroponically grown to seedlings in cups 50, after which cups 50 are then transferred to the upstream end of trough 22 and placed in apertures 48 in trough 22 for hydroponic growing to mature plants. In some instances it may be desirable to incrementally advance strip 46 downstream so as to expose plants 72 as they mature to various actinic, humidity and other growth factors in separate zones through which trough 22 may pass so as to optimize the growth of plants 72.

Trough 22 may be formed with integral tracks 42 and 44. Preferably an inert plastic is used for trough 22 as well as cups 50 and strip 46. Preferably trough 22, cups 50 and strip 46 are opaque. The plastic used can be relatively inexpensive and highly durable and efficient. The handling of plants from seeds through seedling and mature plant stages in system 22 is minimal so that plant damage is minimal. Growing and harvesting of plants in system 20 can be made largely automatic for increased efficiency and reduced cost. System 20 can be successfully utilized in the growth of substantial quantities of cabbage, lettuce, spinach, celery, and the like hydroponically. The produce obtained is of uniformly high quality and large quantity and is obtained very rapidly due to the ideal growing conditions. It will be understood that system 20 can include a plurality of troughs 22, cups 50 and strips 46, with troughs 22 spaced from one another in a suitable configuration and held in such configuration by a plurality of supports and the like (not shown).

FIG. 5

Another version of the trough used in the improved system of the present invention is schematically depicted in transverse cross-section. Thus, trough 102 is shown, which has a closed bottom 104, vertical sidewalls 106 and 108, an open top 110, and a central space 112 also defined by inwardly extending horizontal top rims 114 and 116. Rims 114 and 116 extend the length of trough 102, as do inwardly directed horizontal flanges 118 and 120 spaced below rims 114 and 116 and forming tracks 122 and 124 therebetween into which a longitudinal strip (not shown) may be slideably disposed for carrying a plurality of cups (not shown). Such strip and cups may be similar to strip 46 and cups 50. Hydroponic growing fluid can be provided in space 112 from a conduit 126 which is disposed in the lower end of space 112 and is integral with bottom 104 and sidewall 106. Conduit 126 is provided at intervals with openings 128 to allow hydroponic growing fluid to pass into space 112. Depleted hydroponic fluid exits trough 102 through an outlet 130. Trough 102 can be formed from inert plastic by a single molding or extrusion operation, or by casting or the like to provide a low cost efficient trough for the present system.

FIG. 6

Figure 6:
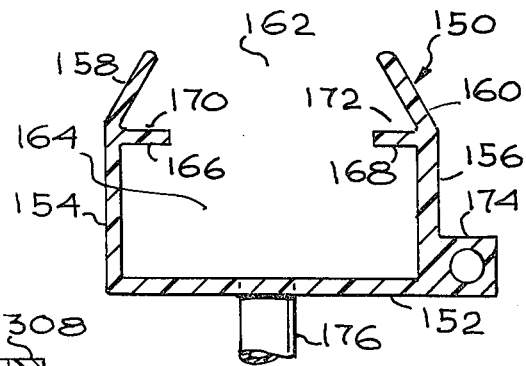
FIG. 6 is a schematic transverse cross-section of another version of the trough used in the improved hydroponic growing system of the present invention.

A further version of the trough used in the system of the present invention is schematically depicted in transverse cross-section in FIG. 6. Thus, there is shown a trough 150 which comprises a closed bottom 152, vertical sides 154 and 156, the upper ends 158 and 160 thereof being angled towards each other to define an open top 162 communicating with an internal space 164. A pair of horizontal internal flanges 166 and 168 extend into space 164 and are spaced below portions 158 and 160 defining therebetween tracks 170 and 172 running the length of trough 150. Trough 150 is provided with an integral unitary conduit 174 formed by an extension of bottom 152 and lower end sidewall 156 so as to be external of the main body of trough 150. Periodic openings (not shown) permit hydroponic growth fluid passing through conduit 174 to enter space 164 and one or more bottom exits 176 remove depleted hydroponic growing fluid from trough 150.

FIG. 2

A second preferred embodiment of the improved hydroponic growing system of the present invention is schematically depicted in fragmentary top plan view partly broken away, in FIG. 2. Thus, system 200 is shown which comprises a generally rectangular trough 204 having a closed bottom and sidewalls (not shown) and an open top 206 defined by flanges 208 and 210 at the upper end of such sidewalls. Trough 202 is generally similar in configuration to trough 22 and provides a pair of parallel longitudinally extending tracks (not shown) within which is slideably disposed a continuous flexible, resilient strip 212.

Strip 212 includes a plurality of large, vertically extending apertures 214 therethrough and a plurality of small vertical apertures 216 therethrough. Apertures 216 are utilized to permit a tool or implement (not shown) to releaseably connect to and draw strip 212 downstream in trough 202. Apertures 214 receive cups 218, 220 and 222. Cups 218, 220 and 222 are cylindrical and hollow with open tops and outwardly extending peripheral flanges 224, 226 and 228, respectively, which overlie apertures 214 to releaseably hold cups 218, 220 and 222 in place with the main body of each cup disposed in the central space 230 of trough 202 for contact with hydroponic growing fluid 232 therein. The bottom 234 of cup 218 is integral with the sidewalls thereof and is provided with a plurality of spaced openings 236 whereas the bottom 238 of cup 220 and the bottom 240 of cup 222 in each instance is covered by a porous screen of metal or plastic. Thus, cup 220 has screen 242 and cup 222 has screen 244. An inlet 246 for the hydroponic fluid extends into space 230 in trough 202 and an outlet is also provided (not shown). Trough 202 is supported by one or more cross-beams 248 in operative position. It will be noted that system 200 is very similar to system 20 and performs similar functions.

FIGS. 7 and 8

A modified version of the strip used in the improved system of the present invention is schematically illustrated in top plan view in FIG. 7 and in side elevation in FIG. 8. Thus, a strip 260 is shown which comprises a plurality of thin, flat, flexible, rectangular sub-strips 262, each bearing a central vertical aperture 264 extending therethrough. Sub-strips 262 are linked together lengthwise by semi-circular links 266 disposed through openings (not shown) so that strip 260 has improved flexibility. Each sub-strip 262 can be easily removed from the associated links 226 for replacement, cleaning, etc. Strip 260 can easily be substituted for strip 212 or strip 46, as desired.

FIG. 9

Figure 9:
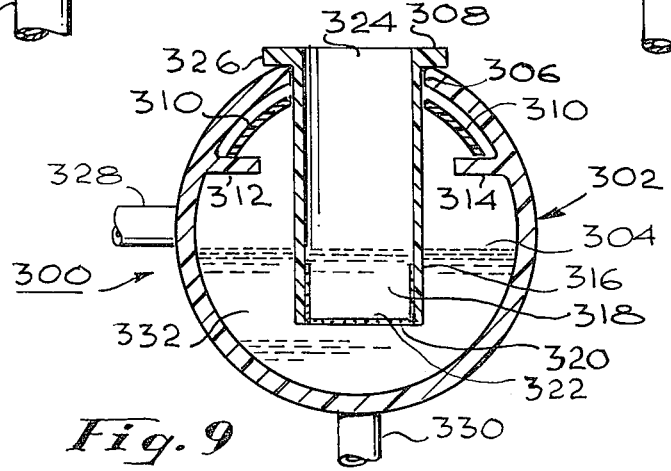

A third preferred embodiment of the improved hydroponic growing system of the present invention is schematically depicted in transverse cross-section in FIG. 9. Thus, system 300 is shown which comprises an elongated cylindrical, tubular trough 302 having a central space 304 and an open top 306 down through which are releasably disposed a plurality of cups 308 disposed in spaced relation to and supported by a curved, longitudinal extending strip 310. The curvature of strip 310 approximates that of the upper portion of trough 302, and the lower ends of strip 310 are supported by horizontal flanges 312 and 314 extending into space 304.

Each cup 308 comprises a cylindrical hollow body 316 defining a central space 318 and having a bottom 320 covered by a porous wire grid 322. The top 324 of cup 308 is open and is provided with an outwardly extending horizontal peripheral annular flange 326 which aids in holding cup 308 in the proper vertical orientation in trough 302. Trough 302 is provided with one or more hydroponic growth fluid inlets 328 and outlets 330 and hydroponic fluid 332.

It will be noted that substantially all of the components specified for the embodiments shown in the accompanying drawings can be fabricated at low cost from readily available, inexpensive materials such as impact resistant, durable plastics and the like. Therefore, the hydroponic system of the present invention can be installed for relatively low cost. Moreover, the simple nature of the components and the ease of operation of the system facilitate efficient use of the system over long periods of time with little maintenance so that hydroponic growing can be carried out in a productive, desirable manner.

The method of the present invention as described above has been sucessfully carried out in the production of large quantities of leaf-type lettuce and the like plants which yield one harvestable product per seed, in a controlled environment utilizing a minimum of personnel. The following specific Example illustrates the method.

EXAMPLE

Bibb lettuce seeds are germinated in a container of deionized water aerated with an air pump and maintained at a constant temperature of 70° F. After five days the germinated seedlings are removed and placed into 228 separate cylindrical flanged growing cups (one plant per cup) having an i.d. of ¾", an o.d. of 0.84", a depth of about 1" and a bottom made of 16 U.S. Standard mesh stainless steel screen. The growing cups are placed into a matrix with a spacing of 1½" in a square configuration, and suspended in a pan of ½ strength standard aqueous plant nutrient (Hoagland's) solution. The level of the solution is maintained so that only the bottoms of the cups are wetted. The solution is agitated by means of a circulating pump to bring fresh aerated nutrient solution into contact with the bottoms of the cups and the roots of the plants. The seedlings remain in this pan receiving both natural and artificial actinic radiation until they reach the desired size for transplanting.

When the plants have reached this stage, the matrices are removed from the pan and carried to the "seedling" end, that is, the upstream end of a growing trough with a 2"×1¾" internal rectangular cross-section, 114' long. The "seedling" end of the growing trough is equipped with a station holding a 120' reel of carrier strip (made of 1/32"×2" PVC) attached to another 120' section of carrier strip installed in the growing trough. A gearmotor mounted at the opposite, "harvest" (downstream) end of the trough pulls the 120' sections of carrier strip through the trough. At the seedling end transplant personnel transfer the plants in the cups from the matrices into circular apertures of 0.875" diameter spaced 6" apart along the length of the moving carrier strip. Each cup is vertically suspended through the aperture in the strip by the cup's peripheral rim (1.125" diameter) so that the body of the cup hangs down into the trough. The process continues until the entire trough is filled with lettuce seedlings in their growing cups. The trough is then supplied with recirculating full strength nutrient solution (Hoagland's).

The plants are allowed to grow to maturity (head weight 50–175 grams) in the troughs. The process takes from 21–35 days (in Somis, Calif.) depending on the time of year and local weather conditions. Harvesting is accomplished by first attaching a blank carrier strip at the "seedling" end of the trough and then pulling the strips from the "harvest" end out of the trough. The growing cups are removed from the carrier strip as the loaded strip is pulled from the trough. The heads of lettuce are separated from the growing cups by twisting or cutting the plant stems. Severed root material from this crop is then removed from the trough by attaching a cleaning "pig" and another blank carrier strip at the "seedling" end and pulling the assembly through the trough. The system is now ready to accept more transplants.

It will be understood that in certain instances seedlings can be introduced into the trough through the strip apertures and can be grown to mature plants in the trough without having to use the cups. it is desirable to use bare root seedlings for such purposes. Moreover, the size of the strip apertures must be adjusted to provide adequate support for the seedlings in the trough.

Various other modifications, changes, alterations and additions can be made in the improved system of the present invention, its components and parameters and in the improved method of the present invention, its steps and parameters. All such changes, modifications, alterations and additions as are within the scope of the appended claims form part of the present invention.

What is claimed is:

1. An improved hydroponic growing system, said system comprising, in combination:
    a. an elongated hollow trough having substantially closed sidewalls and bottom and an open top defining a central space, said trough defining a pair of spaced horizontal tracks extending into said space along the length thereof;
    b. an elongated flexible strip horizontally slideably disposed in said tracks and defining spaced apertures extending vertically therethrough along the length thereof;
    c. a plurality of plant growing cups, each said cup comprising a hollow body having a central space, an open top, a porous bottom and substantially closed sidewalls, said sidewalls bearing peripherally outwardly extending support means, each of said cups being disposed in a different one of said apertures with said body extending downwardly into said trough space below said strip and with said cup support means releasably securing said cup to said strip.

2. The improved system of claim 1 wherein said system includes base support means releasably holding said trough in operative position and wherein said cup, strip and tracks seal the top of said trough space.

3. The improved system of claim 2 wherein said trough includes hydroponic growing fluid and spaced inlets and exits for said fluid.

4. The improved system of claim 3 wherein said trough includes an elongated, integral, hydroponic growing fluid make-up conduit extending along the length thereof and defining spaced exits for passage of said fluid from said conduit to said trough space adjacent said cups.

5. The improved system of claim 4 wherein said trough is plastic and is generally rectangular with integral spaced tracks and wherein said strip is generally flat, flexible resilient plastic.

6. The improved system of claim 3 wherein said trough is generally cylindrical and wherein said strip is curved with depending sides to match the curvature of the upper end of said trough.

7. The improved system of claim 3 wherein said strip is generally flat, thin and unitary and includes means to facilitate drawing of said strip through said trough.

8. The improved system of claim 1 wherein said strip comprises a series of sub-strips disposed along the length of said trough and flexibly releasably secured together end-to-end with link means.

9. The improved system of claim 1 wherein said cup bottom defines a plurality of spaced holes extending generally vertically therethrough, said holes permitting plant root and fluid passage therethrough.

10. The improved system of claim 9 wherein said cup bottom includes a grid insert of metal.

11. The improved system of claim 9 wherein said cup bottom is integral with said sidewalls.

12. The improved system of claim 9 wherein said cup is generally cylindrical in configuration, comprises plastic and bears an outwardly extending annular ring which comprises said cup support means.

13. An improved hydroponic plant growing method, said method comprising, in combination:
    a. growing a plant in a hollow cup having a porous bottom which permits passage of plant roots and hydroponic growing fluid therethrough, an open top and generally closed sidewalls, while said cup is releasably suspended generally vertically through an aperture in a flexible resilient carrier strip slideably disposed longitudinally in spaced tracks in the open top of a hollow growing trough containing hydroponic growing fluid in a central space therein below said strip, the lower end of said cup being above the bottom of said trough in said space, the upper end of said cup being releasably connected to said strip, the level of said hydroponic growing fluid at least periodically being at least up to the bottom of said cup;
    b. periodically incrementally advancing said cup along the length of said trough by sliding said strip along said length;
    c. at least periodically flowing makeup hydroponic growing fluid into and through said trough and removing nutrient depleted hydroponic growing fluid from said trough; and,
    d. harvesting said plant.

14. The method of claim 13 wherein a plurality of said plants are disposed in a plurality of said cups disposed through a plurality of said apertures along the length of said strip in said trough.

15. The method of claim 14 wherein new plants are periodically added in new ones of said cups to unoccupied increments of said strip at the upstream end of said trough.

16. The method of claim 15 wherein said new plants are first grown from seeds to seedlings in a separate seedling zone before said cups are added to said strip at the upstream end of said trough.

17. The method of claim 13 wherein said plants are periodically harvested adjacent the downstream end of said trough.

* * * * *